Oct. 18, 1960 W. A. McKEGGIE 2,956,576
DEVICE FOR SENSING THE RATE OF CHANGE OF FLOW OF LIQUIDS
Filed June 4, 1957 2 Sheets-Sheet 1

INVENTOR
WILLIAM A. McKEGGIE

BY

ATTORNEYS

United States Patent Office 2,956,576
Patented Oct. 18, 1960

2,956,576
DEVICE FOR SENSING THE RATE OF CHANGE OF FLOW OF LIQUIDS

William A. McKeggie, Teddington, England, assignor to D. Napier & Son Limited, London, England, a company of Great Britain Filed June 4, 1957, Ser. No. 663,487

Claims priority, application Great Britain June 11, 1956

2 Claims. (Cl. 137—100)

This invention relates to devices for sensing the rate of change of flow of liquids flowing through pipes, the word "flow" being used herein to mean the volume of liquid flowing through the pipe in unit time.

The device has a variety of applications. One particular application is in the fuel system of a prime mover running on liquid fuel, to provide an acceleration control device. Thus, according to the invention a fuel system for a variable speed prime mover running on liquid fuel has control means for varying the fuel flow and a device for sensing the rate of change of flow of the fuel as above set forth, which device is adapted to prevent the rate of change of the fuel flow exceding a permissible limit, thereby providing an acceleration control device.

The construction, application, and operation of various forms of the device will now be described by way of example with reference to the accompanying drawings, in which.

Figure 1:
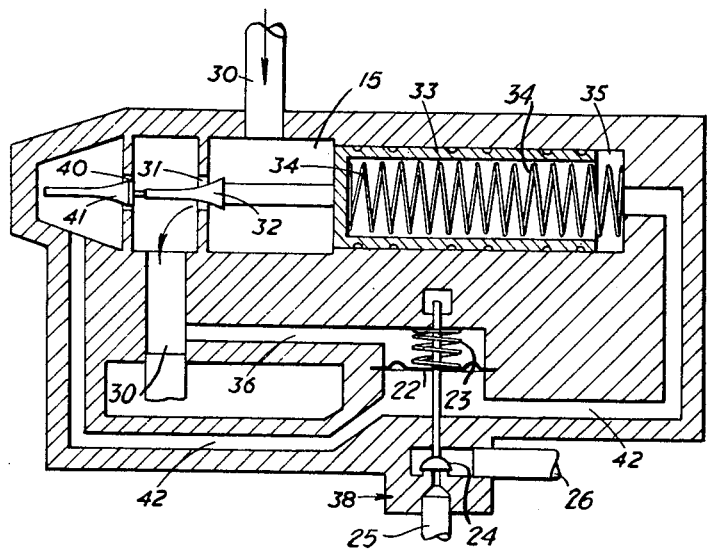
Figure 1 is a diagrammatic sectional elevation of a device embodying the invention and in which both the main orifice and the auxiliary orifice are variable.

Referring to the drawings, and particularly to Figure 1, in the flow sensing device there shown, the flow is through a pipe 30 in the direction of the arrow, the pipe containing a variable orifice 31 controlled by the tapered needle 32. The needle 32 is mounted on a piston 33 loaded by a spring 34 and contained in a cylinder 35. In this device the left-hand end of the piston 33 is exposed to the pressure of the liquid in the pipe 30 upstream of the main orifice 31 by way of passage 15, while the right-hand end of this piston is exposed to the pressure in the pipe 30 downstream of the main orifice 31 through a passage 42 containing an auxiliary orifice 40. A pressure-sensitive element 38 is provided. In this device, if the flow of liquid through the pipe 30 increases, the pressure drop across the main orifice 31 will increase, thereby forcing the piston 33 to the right against the action of the spring 34 and withdrawing the tapered needle 32 from the orifice 31 to an extent depending upon the movement of the piston 33. The change in volume of the space to the right of the piston 33 is accompanied by flow through the auxiliary orifice 40, the pressure drop produced across this orifice depending upon the rate of change of flow of liquid in the pipe 30. This pressure drop acts on diaphragm 22 to open valve 24 when the flow is increasing in pipe 30 at a rate determined by the area of the diaphragm and force of spring 23.

It may be desirable in certain cases also to vary the area of the auxiliary orifice 40 in dependence on the flow through the pipe 30 so that the response of the pressure-sensitive element will differ at different flows. The auxiliary orifice 40 is variable by means of a tapered needle 41 carried as an extension beyond the end of the tapered needle 32 which controls the main orifice 31 and which is likewise actuated by the piston 33. In this case the variable auxiliary orifice 40 is disposed at the entrance to the passage 42 which leads first to the underside of the diaphragm of the pressure-sensitive element 38 and thence to the right-hand end space of the cylinder 35.

Figure 2:
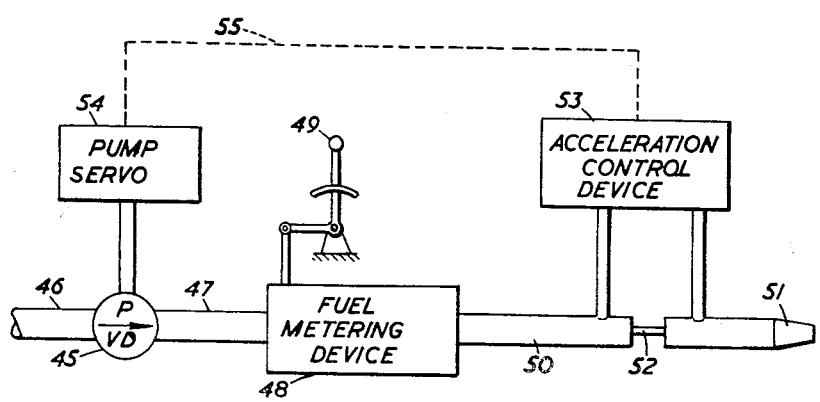
Figure 2 is a diagram showing how a device embodying the invention is applied to the fuel system of a gas turbine prime mover running on liquid fuel to serve as an acceleration control operative on a variable delivery fuel system.
Figure 3:
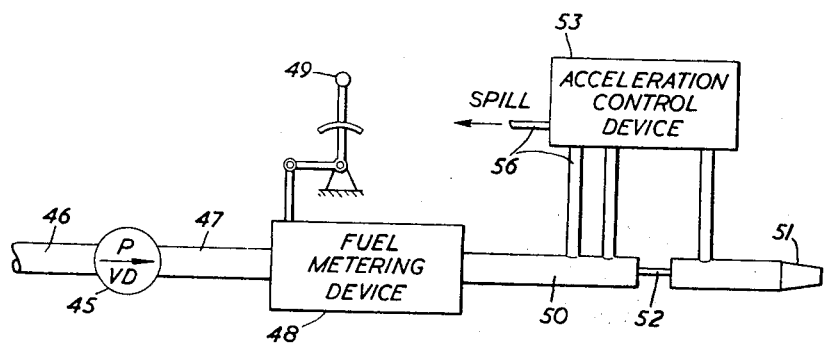
Figure 3 is a diagram similar to Figure 2 but showing an embodiment in which the acceleration control works by causing spillage of metered fuel.
Figure 4:
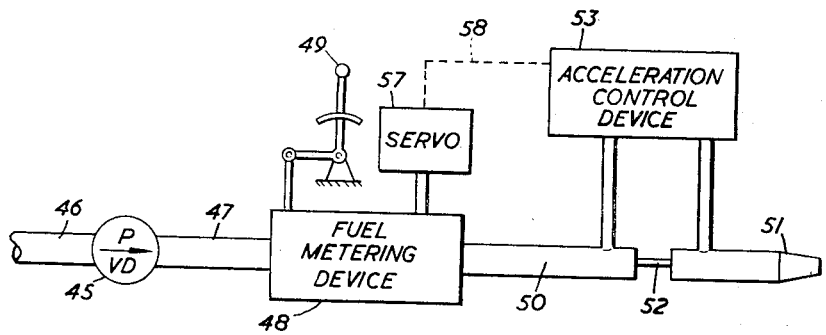
Figure 4 is a diagram similar to Figure 2 but showing an embodiment in which the acceleration control operates upon a fuel metering device.

As previously indicated, the device has a variety of applications, for instance in the fuel system of a gas turbine prime mover running on liquid fuel to provide an acceleration control. An acceleration control is required for a variable speed gas turbine prime mover to impose a limit on the amount of additional fuel that can be introduced into the prime mover when it is being accelerated, for avoiding overheating of the turbine. Three such applications are illustrated diagrammatically in Figures 4 to 6. In this fuel system fuel is drawn by a variable delivery pump 45 through a pipe 46 leading from a fuel tank (not shown) and is delivered through a pipe 47 to a fuel metering unit 48 which is adapted to vary the flow of fuel in response to movements of a pilot's control 49. The metered fuel passes through a pipe 50 to one or more burner nozzles 51 in the combustion chambers (not shown) of the prime mover. In the pipe 50 there is provided an orifice 52, which may be variable, corresponding to the main orifice 31 in Figure 1. The rate of change of flow through the orifice 52 is sensed by an acceleration control device 53 such as shown in Figure 1. The acceleration control device acts on the fuel supply system by any of the following methods. In one method shown in Figure 2 the half ball valve of the pressure-sensing element of the device controls a hydraulic servo motor 54 through a connection 55, the servo motor 54 controlling the delivery of the pump 45. When the rate of change of flow of the fuel through the pipe 50 attains a permissible upper limit during acceleration the half ball valve opens, permitting fluid to leak from the servo motor 54 to reduce the stroke of the pump 45. In another method shown in Figure 3 the half ball valve permits metered fuel to bleed off from the pipe 50 through a spill pipe 56 to reduce the amount of fuel supplied to the burners 51 when the permissible upper limit of rate of change of flow in the pipe 50 is attained. In a third method shown in Figure 4 the half ball valve controls a servo motor 57 through a connection 58, the servo motor 57 influencing a control element of the fuel metering unit 48 to reduce the supply of metered fuel, should the rate of change of flow of the fuel through the pipe 50 attain a permissible upper limit during acceleration.

What I claim as my invention and desire to secure by Letters Patent is:

1. A device for sensing the rate of change of flow of a liquid through a pipe comprising a pipe, means defining a main orifice in said pipe, a cylinder, a piston slidable in said cylinder, a spring biasing said piston towards one end of said cylinder, passage means extending from said pipe upstream of said main orifice to said cylinder on one side of said piston, passage means extending from said pipe downstream of said main orifice to said cylinder on the other side of said piston, means defining an auxiliary orifice in one of said passage means, a spring-loaded diaphragm disposed between two diaphragm chambers, one of these chambers being connected to one side of the auxiliary orifice and the other chamber being connected to the opposite side of the auxiliary orifice whereby the pressure differential between these chambers corresponds to the presusre drop across the auxiliary orifice, and control means connected to the diaphragm, means adapted to vary the area of said auxiliary orifice controlled in dependence on the position of said piston.

2. A device according to claim 1, which includes means adapted to vary the area of said auxiliary orifice also controlled in dependence on the position of said piston.

References Cited in the file of this patent

UNITED STATES PATENTS

| | | |
|---|---|---|
| 2,367,176 | Ahlstrom et al. | Jan. 16, 1945 |
| 2,683,485 | Harris | July 13, 1954 |
| 2,765,800 | Drake | Oct. 9, 1956 |
| 2,874,764 | Booth et al. | Feb. 24, 1959 |